United States Patent
Walker et al.

(10) Patent No.: US 6,397,193 B1
(45) Date of Patent: *May 28, 2002

(54) METHOD AND APPARATUS FOR AUTOMATICALLY VENDING A COMBINATION OF PRODUCTS

(75) Inventors: Jay S. Walker, Ridgefield; Daniel E. Tedesco; James A. Jorasch, both of Stamford; Robert R. Lech, Norwalk, all of CT (US)

(73) Assignee: Walker Digital, LLC, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/012,163

(22) Filed: Jan. 22, 1998

Related U.S. Application Data

(63) Continuation-in-part of application No. 08/947,798, filed on Oct. 9, 1997, which is a continuation-in-part of application No. 08/920,116, filed on Aug. 26, 1997, now Pat. No. 6,119,099.

(51) Int. Cl.[7] .............................................. G06F 17/60

(52) U.S. Cl. .......................... 705/16; 705/20; 700/231; 700/232; 700/238

(58) Field of Search .................. 364/479.01, 479.02, 364/479.03, 479.04–479.09, 479.11, 479.12, 479.13, 479.14; 705/15, 5, 1, 22, 20, 16; 700/231, 232, 233, 236, 238, 239, 240, 244

(56) References Cited

U.S. PATENT DOCUMENTS

| | | | |
|---|---|---|---|
| 3,573,747 A | 4/1971 | Adams et al. | ............ 340/172.5 |
| 4,008,792 A | 2/1977 | Levasseur et al. | |

(List continued on next page.)

FOREIGN PATENT DOCUMENTS

| | | | |
|---|---|---|---|
| EP | 0 085 546 A2 * | 8/1983 | ............. G07F/5/24 |
| EP | 512413 | 11/1992 | |
| EP | 0 817 138 A1 | 1/1998 | |
| JP | 58-132886 A | 8/1983 | |
| JP | 02001093 A | 1/1990 | |
| JP | 02208798 A | 8/1990 | |
| JP | 04235700 A | 8/1992 | |
| JP | 5242363 A | 9/1993 | |
| JP | 07065218 A | 3/1995 | |
| JP | 95139380 | 6/1995 | |
| JP | 95162556 | 6/1995 | |
| JP | 08030848 A | 2/1996 | |
| JP | 8-147545 | 6/1996 | |
| JP | 08221645 A | 8/1996 | |
| JP | 08329323 A | 12/1996 | |
| JP | 09062908 A | 3/1997 | |
| KR | 9503826 | 4/1995 | |
| WO | WO 97/24701 | 7/1997 | |
| WO | WO 97/28510 * | 8/1997 | ......... G06F/153/00 |

OTHER PUBLICATIONS

Gilbert, Allan Z., "Operators Can Gain With Creative Merchandising", Automatic Merchandiser, p. 80, Oct. 1992.*

(List continued on next page.)

Primary Examiner—James P. Trammell
Assistant Examiner—John W. Hayes
(74) Attorney, Agent, or Firm—Dean P. Alderrucci

(57) ABSTRACT

The present invention relates to a method and apparatus for automatically delivering a combination of products from a vending machine at a package price. The method of the present invention includes the step of receiving a package identifier. The method also includes the steps of identifying a set of products corresponding to the package identifier and determining a package price corresponding to the identified set of products. The method further includes the steps of outputting a signal representing the package price and outputting a signal representing an instruction to dispense a unit of each identified product. An apparatus is also disclosed to carry out the method steps of the present invention.

25 Claims, 16 Drawing Sheets

U.S. PATENT DOCUMENTS

| | | | |
|---|---|---|---|
| 4,108,361 A | 8/1978 | Krause | 235/375 |
| 4,237,537 A | 12/1980 | Pitches et al. | 364/465 |
| 4,245,730 A | 1/1981 | Bachmann et al. | 194/1 A |
| 4,282,575 A | 8/1981 | Hoskinson et al. | 364/479 |
| 4,323,770 A | 4/1982 | Dieulot et al. | 235/375 |
| 4,412,292 A | 10/1983 | Sedam et al. | |
| 4,494,197 A | 1/1985 | Troy et al. | 364/412 |
| 4,498,570 A | 2/1985 | King et al. | |
| 4,500,880 A | 2/1985 | Gomersall et al. | 340/825.35 |
| 4,593,361 A | 6/1986 | Otten | 364/479 |
| 4,654,800 A | 3/1987 | Hayashi et al. | 700/236 |
| 4,669,730 A | 6/1987 | Small | 273/138 A |
| 4,677,553 A | 6/1987 | Roberts et al. | 364/412 |
| 4,679,150 A | 7/1987 | Hayashi et al. | |
| 4,689,742 A | 8/1987 | Troy et al. | 364/412 |
| 4,723,212 A | 2/1988 | Mindrum et al. | 364/401 |
| 4,760,247 A | 7/1988 | Keane et al. | 235/454 |
| 4,766,548 A | 8/1988 | Cedrone et al. | 364/479 |
| 4,815,741 A | 3/1989 | Small | 273/138 A |
| 4,825,045 A | 4/1989 | Humble | 235/383 |
| 4,834,231 A | 5/1989 | Awane et al. | 194/217 |
| 4,839,507 A | 6/1989 | May | 235/381 |
| 4,854,590 A | 8/1989 | Jolliff et al. | 273/138 A |
| 4,859,838 A | 8/1989 | Okiharu | 235/383 |
| 4,882,473 A | 11/1989 | Bergeron et al. | 235/380 |
| 4,906,828 A | 3/1990 | Halpern | 705/41 |
| 4,908,761 A | 3/1990 | Tai | 364/401 |
| 4,910,672 A | 3/1990 | Off et al. | 364/405 |
| 4,922,522 A | 5/1990 | Scanlon | 379/95 |
| 4,937,853 A | 6/1990 | Brule et al. | 379/96 |
| 4,973,952 A | 11/1990 | Malec et al. | 340/825.35 |
| 4,982,337 A | 1/1991 | Burr et al. | 364/479 |
| 4,993,714 A | 2/1991 | Golightly | 273/138 A |
| 5,056,019 A | 10/1991 | Schultz et al. | 364/405 |
| 5,091,713 A | 2/1992 | Horne et al. | 340/541 |
| 5,119,295 A | 6/1992 | Kapur | 364/412 |
| 5,128,862 A | 7/1992 | Mueller | 364/405 |
| 5,132,914 A | 7/1992 | Cahlander et al. | 364/478 |
| 5,172,328 A | 12/1992 | Cahlander et al. | 364/478 |
| 5,173,851 A | 12/1992 | Off et al. | 364/401 |
| 5,177,342 A | 1/1993 | Adams | 235/379 |
| 5,192,854 A | 3/1993 | Counts | 235/375 |
| 5,201,010 A | 4/1993 | Deaton et al. | 382/7 |
| 5,216,595 A | 6/1993 | Protheroe | 364/412 |
| 5,223,698 A | 6/1993 | Kapur | 235/375 |
| 5,231,569 A | 7/1993 | Myatt et al. | 364/408 |
| 5,239,165 A | 8/1993 | Novak | 235/375 |
| 5,243,515 A | 9/1993 | Lee | 364/401 |
| 5,245,533 A | 9/1993 | Marshall | 364/401 |
| 5,257,179 A | 10/1993 | DeMar | 364/410 |
| 5,262,941 A | 11/1993 | Saladin et al. | 364/408 |
| 5,267,452 A | 12/1993 | Zinsmeyer et al. | 62/505 |
| 5,274,547 A | 12/1993 | Zoffel et al. | 364/408 |
| 5,283,731 A | 2/1994 | Lalonde et al. | 364/401 |
| 5,287,268 A | 2/1994 | McCarthy | 364/405 |
| 5,297,031 A | 3/1994 | Gutterman et al. | 364/408 |
| 5,302,811 A | 4/1994 | Fukatsu | 235/381 |
| 5,309,355 A | 5/1994 | Lockwood | 364/401 |
| 5,339,250 A | 8/1994 | Durbin | 364/479 |
| 5,353,218 A | 10/1994 | De Lapa et al. | 364/401 |
| 5,353,219 A | 10/1994 | Mueller et al. | |
| 5,367,452 A | 11/1994 | Gallery et al. | 364/401 |
| 5,380,991 A | 1/1995 | Valenica et al. | 235/383 |
| RE34,915 E | 4/1995 | Nichtberger et al. | 364/401 |
| 5,420,606 A | 5/1995 | Begum et al. | 345/156 |
| 5,434,394 A * | 7/1995 | Roach et al. | 235/375 |
| 5,450,938 A | 9/1995 | Rademacher | |
| 5,452,344 A | 9/1995 | Larson | 379/107 |
| 5,459,306 A | 10/1995 | Stein et al. | 235/383 |
| 5,481,094 A | 1/1996 | Suda | 235/383 |
| 5,504,475 A | 4/1996 | Houdou et al. | 340/825.35 |
| 5,510,979 A | 4/1996 | Moderi et al. | 364/405 |
| 5,511,646 A * | 4/1996 | Maldanis et al. | 194/217 |
| 5,572,653 A | 11/1996 | DeTemple et al. | 395/501 |
| 5,581,064 A | 12/1996 | Riley et al. | 235/383 |
| 5,592,375 A | 1/1997 | Salmon et al. | 395/207 |
| 5,592,376 A | 1/1997 | Hodroff | 395/214 |
| 5,592,378 A * | 1/1997 | Cameron et al. | 705/27 |
| 5,602,377 A | 2/1997 | Beller et al. | 235/462 |
| 5,608,643 A * | 3/1997 | Wichter et al. | 364/479.14 |
| 5,611,052 A | 3/1997 | Dykstra et al. | 395/238 |
| 5,612,868 A | 3/1997 | Off et al. | 364/214 |
| 5,613,620 A | 3/1997 | Center et al. | |
| 5,615,269 A | 3/1997 | Micali | 380/49 |
| 5,620,079 A | 4/1997 | Molbak | 194/217 |
| 5,621,201 A | 4/1997 | Langhans et al. | 235/380 |
| 5,621,640 A | 4/1997 | Burke | 395/214 |
| 5,632,010 A | 5/1997 | Briechle et al. | 345/1 |
| 5,701,252 A | 12/1997 | Facchin et al. | 364/479 |
| 5,732,398 A * | 3/1998 | Tagawa | 705/5 |
| 5,734,150 A | 3/1998 | Brown et al. | 235/381 |
| 5,774,868 A * | 6/1998 | Cragun et al. | 705/10 |
| 5,822,736 A * | 10/1998 | Hartman et al. | 705/1 |
| 5,844,808 A * | 12/1998 | Konsmo et al. | 364/479.14 |
| 5,873,069 A * | 2/1999 | Reuhl et al. | 705/20 |
| 5,878,401 A * | 3/1999 | Joseph | 705/22 |
| 5,930,145 A * | 7/1999 | Yuyama et al. | 364/479.01 |
| 5,997,928 A | 12/1999 | Kaish et al. | 426/418 |
| 6,012,834 A | 1/2000 | Dueck et al. | 364/479.08 |
| 6,021,394 A | 2/2000 | Takahashi | 705/10 |
| 6,049,777 A * | 4/2000 | Sheena et al. | 705/10 |
| 6,223,163 B1 * | 4/2001 | Van Luchene | 705/26 |

OTHER PUBLICATIONS

Public Internet Kiosks, Inc., "Public Internet Kiosks, Inc. Receives First Order For Its "Internet Station"—The Vending Machine of the Future", Dialog File 813:PR Newswire, Sep. 16, 1996.*

French et al, "A Pricing Strategy to Promote Low–Fat Snack Choices through Vending Machines", American Journal of Public Health, vol. 87, No. 5, pp. 849–851, May 1997.*

Brochure, "Introducing the Digital MenuBoard", Siren Technologies, Inc., (www sirentech com).

Rehayem, Gilbert, "Opinion: X–Press Betting", Information Systems & Technology, Ontario Lottery Corp.

"Cape Town", Reuters Ltd, Nov. 8, 1979, PM Cycle.

"Save the mark", Financial Time (London), Feb. 1, 1983, Section I, Men & Matters at p. 12.

Cook, Louise, "ConsumerWatch: Clip, Snip, Save", The Associated Press, Mar. 12, 1984, Business News Section.

"POS spectrum: a lottery looks to POS for growth", UMI, Inc., POS News, Jan. 1989, vol. 5, No. 7, p. 8, ISSN: 0896–6230, CODEN: BHORAD.

Kuttner, Robert, "Computers May Turn The World Into One Big Commodities Pit", Business Week, Sep. 11, 1989, Section: Economic Viewpoint, No. 3123 at p. 17.

Schrage, Michael, "An Experiment In Economic Theory; Labs Testing Real Markets", The Record, Nov. 26, 1989, Section: Business at p. B01.

"Let's Play the Cash Register Receipts Lottery", The New York Times, Dec. 25, 1990, Section 1, p. 30, col. 4, Editorial Desk.

Nakayama, Atsushi, "Coca–Cola machines to be 'smarter'; the Teleterminal control system is aimed at keeping customers, and machines, satisfied", The Japan Economic Journal, Feb. 23, 1991, Section: Industry: Chemicals at p. 22.

Del Rosso, Laura, "Marketel says it plans to launch air fare 'auction' in June; Marketel International Inc.", Travel Weekly, Apr. 29, 1991, Section: vol. 50, No. 34, p. 1, ISSN: 0041–2082.

"Philips offers customers financing through Citicorp; Philips Medical Systems North America, Citicorp North America Inc." Health Industry Today, Jun. 1991, Section: vol. 54, No. 6, p. 4, ISSN: 0745–4678.

Pelline, Jeff, "Travelers Bidding On Airline Tickets SF firm offers chance for cut–rate fares" The San Francisco Chronicle, Aug. 19, 1991, Sections: News at p. A4.

Del Rosso, Laura, "Ticket–bidding firm closes its doors; Marketel International; Brief Article", Travel Weekly, Mar. 12, 1992, Section: vol. 51, No. 21, p. 1, ISSN: 0041–2082.

"Coupons get serious; supermarkets use barcodes to prevent misredemptions", Chain Store Age Executive with Shopping Center Age, Oct. 1992, Section: vol. 68, No. 10, p. 68, ISSN: 0193–1199.

"Winn–Dixie/The Salvation Amry Report Contributions For War Against Hunger", PR Newswire, Jun. 10, 1993, Section: Financial News.

Jones, Jeanne, "Data Readers Streamline Management; Scanner Technology Aids Retailers As Well As Plants, Wholesalers", The Houston Post, Jun. 26, 1994, Section: Business at p. D1.

Fiorini, Phillip, "'No Place For Penny?'/Smallest coin doesn't make cents to some", USA Today, Jul. 29, 1994, Section: News at p. 1A.

Smith, Alison, "Survey of UK Consumer Credit and Asset Finance", Financial Times, Nov. 3, 1994, Section: p. VI.

Andreoli, Tom et al., "Cash Machines Offer A Whole Lotto Money For Withdrawl; An Unfortunate Juxtaposition; Block That Metaphor!; Something Street Talk; Fishy In Springfield; State Street Sears?; Champion As Underdog; A 'Whole Language' Graduate", Crain's Chicago Business, Jun. 19, 1995, Section: News at p. 8.

"Spain: BBV launches new card", Cards International, Jun. 22, 1995 at p. 5.

Greene, Jan, "Farm bills please assns; National Grocers Association", Supermarket News, vol. 35, Dec. 23, 1985 at p. 6.

Knippenberg, Jim, "Will local radio empires strike back?", The Cincinnati Enquirer, Jul. 23, 1995, Section: Tempo at p. F01.

Brochure, "Cyber Bid", Net Fun Ltd., Copyright 1996.

Bonnici, Joseph et al., "Consumer issues in coupon usage: An exploratory analysis", Journal of Applied Business Research, Winter 1996/1997, Section: vol. 13, No. 1, pp. 31–40, ISSN: 0892–7626, CODEN: JPBEBK.

Maras, Elliot, "Software opens doors to scientific machine menuing", Automatic Merchandiser, Feb. 1996, p. 36, ISSN: 0002–7545.

Hadley, Kimberly, "Pastors praying anti–arson effort will burn bias", The Nashville Banner, Jul. 26, 1996, Section: News at p. A13.

Gapper, John, "NatWest reports rise in bad debt", Financial Times, Jul. 31, 1996, Section: News: UK; at p. 09.

Gilbert, Allan Z., "A call to action for wireless data communication", Automatic Merchandiser, Aug. 1996, Financial Management section.

"LYNX TECHNOLOGY: Lynx to provide business leasing programme through Schroder Leasing", M2 Presswire, Aug. 9, 1996.

Taylor, Paul, "Towards a dream market", Financial Times (London), Sep. 4, 1996, Section: Survey—FT IT; at p. 03.

Singletary, Michelle, "Electronic World, Unchecked Problem? U.S. Move to Paperless Payments Raises Worries About Those Who Don't Use Banks", The Washington Post, Mar. 4, 1997, Section: Financial at p. C01.

Hirschfeld, David, "Increasing Profits Through Automation", Independent Vendors Association Quarterly, Apr./May/Jun. 1997.

"Avco Financial Services", National Home Furnishing Association, (http //www homefurnish comNHFA/avco htm), download date: May 23, 1997.

Website, "Catalina Marketing Corporation", (http //catalinamktg com/prodcdir htm), download date: May 29, 1997.

Riordan, Teresa, "Patents; A novel approach to making a better spermicide harks back to some old–fashioned methods", The New York Times, Jun. 9, 1997, Section D, p. 2, col. 1, Business/Financial Desk.

Nairn, Geoff, "The key to your identity: Falling costs will allow fingerprint verification to be widely used, reports Geoff Nairn", Financial Times (London), Jul. 15, 1997, Section: Technology; at p. 12.

"The United Computer Exchange, How It All Works", (http //www uce com/howitworks html), download date: Jul. 23, 1997.

"Classified 2000: The Internet Classifieds", Classifieds2000, Inc., (http //www classifieds2000 com/cgi–cls/Display exe?C2K+aboutus), download date: Aug. 6, 1997.

"General trading information and terms provided by tradingfloor.com", (http //www tradingfloor com/info htm), download date: Aug. 14, 1997.

"NASDAQ", Information Sheet, (http //home axford com/corfin/corf1 1 htm), download date: Aug. 15, 1997.

Brochure, "For the Crew & the Customer: The Best Drive–Thru & Grill Service", Olivetti North America, Winter 1998.

"VendMaster: Windows and Vending Software, Reports", (http //www vendmaster com/reports_main html), download date: Feb. 6, 1998.

PCT International Search Report for Application No. PCT/US98/21216, dated May 4, 1999.

* cited by examiner

| AUTHORIZATION TABLE 300 | OPERATOR IDENTIFIER 302 | AUTHORIZATION CODE 304 |
|---|---|---|
| | 1234 | 6767 |
| | 1235 | 9595 |

FIG. 3

INVENTORY TABLE 400

| PRODUCT IDENTIFIER 410 | DISPENSER IDENTIFIER 412 | AVAILABLE INVENTORY 414 | INDIVIDUAL PRICE 416 | COMPONENT PRICE 418 | ITEM CATEGORY 420 |
|---|---|---|---|---|---|
| COLA | A1 | 6 | $0.75 | $0.50 | SODA |
| ORANGE | A2 | 0 | $0.75 | $0.40 | SODA |
| ROOT BEER | A3 | 5 | $0.75 | $0.30 | SODA |
| BUBBLE | B1 | 3 | $0.75 | $0.30 | GUM |
| MINT | B2 | 5 | $0.45 | $0.25 | GUM |
| FRUIT | B3 | 0 | $0.45 | $0.20 | GUM |
| REGULAR | C1 | 4 | $0.65 | $0.40 | CHIPS |
| LOW FAT | C2 | 7 | $0.70 | $0.45 | CHIPS |
| SOUR CREAM | C3 | 5 | $0.75 | $0.50 | CHIPS |

FIG. 4

PACKAGE OFFER TABLE 500

| PACKAGE IDENTIFIER 510 | PACKAGE PRICE 512 | PACKAGE COMPONENT IDENTIFIER 1 514 | PACKAGE COMPONENT IDENTIFIER 2 516 | PACKAGE COMPONENT IDENTIFIER 3 518 | STATUS 520 | RULES IDENTIFIER 522 |
|---|---|---|---|---|---|---|
| P1 | $1.00 | A1 | C1 | N/A | ACTIVE | R1 |
| P2 | $1.30 | A1 | B1 | C3 | INACTIVE | R2 |
| P3 | $1.20 | A2 | B1 | C3 | ACTIVE | R2 |
| P4 | $1.10 | A3 | B1 | C3 | ACTIVE | R2 |
| P5 | $0.95 | A1 | C2 | N/A | ACTIVE | OPERATOR |

AUTOMATIC PACKAGE RULES TABLE 600

| RULE IDENTIFIER 610 | RULE PRICE 612 | COMPLEMENTARY PRODUCT CATAGORIES 614 | PACKAGE OFFER TYPE 616 |
|---|---|---|---|
| R1 | $1.00 | SODA, CHIPS | UPSELL |
| R2 | ≥ $2.25 | SODA, GUM, CHIPS | PERIODIC |

606 ⟶ (R1 row)
608 ⟶ (R2 row)

METHOD AND APPARATUS FOR AUTOMATICALLY VENDING A COMBINATION OF PRODUCTS

CROSS-REFERENCE TO RELATED CORRESPONDING APPLICATIONS

This is a continuation-in-part of commonly owned, co-pending U.S. patent application Ser. No. 08/947,798 entitled "Method and Apparatus for Dynamically Managing Vending Machine Inventory Prices" filed Oct. 9, 1997, and commonly owned, co-pending U.S. application Ser. No. 08/920,116 entitled "Method and System for Processing Supplementary Product Sales at a Point-of-Sale Terminal" filed Aug. 26, 1997, issued as U.S. Pat. No. 6,119,099, the entirety of each incorporated by reference herein.

BACKGROUND OF THE INVENTION

1. Field of the Invention

The present invention relates generally to vending machines. More particularly, the present invention relates to a method and apparatus for automatically controlling a vending machine to enable a combination of products to be sold during a single transaction.

2. Description of the Related Art

It is believed that the first modern vending machine was installed in the late 1880s. The first vending machines were rudimentary devices primarily designed to dispense cigarettes and postcards. Modern vending machines are employed to store and dispense a vast array of merchandise in response to a customer request and appropriate payment. Such merchandise includes drinks, candy, frozen deserts, snacks, video tapes and children's toys.

Many entrepreneurs are attracted to the basic concept of selling products using a vending machine. Vending machines are generally considered to have significant advantages over traditional merchandising. Specifically, vending machines enable the automated sale of merchandise at unconventional locations and times, and they do not require sales personnel to bring about sales.

Although the basic advantages of vending machines are significant, prior art vending machines have several disadvantages when compared to traditional merchandising, particularly relating to inventory control and pricing. With respect to inventory control, a first disadvantage is the difficulty of selling or "turning over" an inventory of low demand items or items of inferior quality. Although some vending machine suppliers offer to buy back inventory from operators who no longer want to sell certain products, such suppliers often fail to live up to their offer when an operator tries to exercise this option.

Some inventions have attempted to improve inventory turnover by providing a vending machine that provides incentives for customers to buy larger quantities of a product. One such invention is disclosed by King et al. in U.S. Pat. No. 4,498,570. King discloses a vending machine having a switching device for establishing a first price for a first item of a product sold and for establishing a second price for additional items of the product sold in the same transaction. Essentially, the King invention provides a quantity discount by allowing the purchaser to freely select the number of items to be purchased.

Levasseur et al. also disclose an apparatus that enables quantity discounts for vending machines in U.S. Pat. No. 4,008,792. Levasseur et al. disclose a control circuit for a vending machine which enables a vending machine offering a variety of products at a variety of prices to calculate a different price for a particular product based on the quantity of the product purchased. In U.S. Pat. No. 4,679,150, Hayashi et al. disclose an automatic vending machine that enables the purchase of a product at a quantity discount.

The inventions of King, Levasseur and Hayashi advanced the art by providing various means that enable a customer to purchase a product at a quantity discount. This advancement may advantageously encourage additional purchases of an item at a vending machine, but they are likely to affect only customers who can utilize multiple units of the same product. Further, these inventions do not address the broader problem of improving sales of a low demand product.

Other attempts to address the disadvantages associated with inventory control include inventory analysis products that employ a proactive approach. These products assist operators in deciding what products to stock, when to restock and at what quantities. Still other attempts to address inventory control problems include systems that enable operators to remotely monitor inventory and remotely retrieve sales data, such as the system described by U.S. Pat. No. 4,412,292.

With respect to price management, a second disadvantage is the difficulty of selling a product for a price commensurate with the product's demand. Although conventional vending machines allow an operator to adjust the prices of products, price adjustments are not automatic, and they are readily evident to purchasers which may adversely affect the product's demand.

Some operators have addressed the price management problems by selling complementary products, such as chips and soda, from the same machine. By selling complementary products, operators hope to passively induce consumers to purchase lower demand products, as certain snacks may be, by placing them in proximity to higher demand products, as certain sodas may be. Operators may also use this technique to indirectly pair highly profitable products with less profitable ones. The passive nature of this technique, however, is a significant problem. Because vending machines, by their nature, do not employ sales personnel, customers presently are not actively induced to purchase low demand or perishable products.

A need therefore exists for a method and apparatus that addresses the deficiencies of the prior art. Specifically, a need exists for a vending method and apparatus that actively promotes the sale of low demand, perishable and less profitable products. Accordingly, the shortcomings associated with the related art have heretofore not been adequately addressed. The present invention addresses such problems by providing an apparatus and processing approach that have not previously been proposed.

SUMMARY OF THE INVENTION

An object of the present invention is to enable a vending machine to sell multiple products for a single price. A feature of the present invention is to enable a vending machine to employ marketing techniques for promoting and selling complementary products.

An advantage of the present invention is that it enables a vending machine operator to adjust a product's price as part of a package without affecting the individual sale price of the product. Another advantage of the present invention is that it enables a vending machine to actively promote the sale of low demand and perishable products by offering packages combining such products with complementary high-demand products. Yet another advantage of the present invention is that it enables a vending machine to provide a discount to a consumer for combined product purchases.

According to the present invention, a method and apparatus are disclosed for automatically delivering units of a combination of component products during a single transaction. The method includes the step of receiving a package identifier. The method further includes the step of identifying the component products corresponding to the package identifier. The method also includes the step of determining a package price corresponding to the package of component products. The method still further includes the steps of outputting a signal representing the package price, and outputting a signal representing a request to dispense a unit of each identified product.

The above object, feature and advantages and other objects, features and advantages are readily apparent from the detailed description when taken in connection with the accompanying drawings.

BRIEF DESCRIPTION OF THE DRAWINGS

A more complete appreciation of the invention and many of the attendant advantages thereof may be readily obtained by reference to the following detailed description when considered with the accompanying drawings, wherein:

FIG. 3 depicts an exemplary authorization table stored in the memory of the vending machine of FIG. 1;

FIG. 4 depicts an exemplary inventory table stored in the memory of the vending machine of FIG. 1;

FIG. 5 depicts an exemplary package offer table stored in the memory of the vending machine of FIG. 1;

DETAILED DESCRIPTION

Definitions

For the purposes of this specification, the following terms will have the corresponding definitions:

Complementary Product: A product that may be advantageously paired with a second product, such as by price or product type.

Component: A single product that is part of a package.

Component Price: The price of a unit of a product sold as part of a package.

Individual Price: The price of a unit of a product sold separately.

Package: A combination of at least two component products.

Package Price: The single price of a combination of at least two component products.

Product: A classification of merchandise, such as a particular brand of soda.

Unit: A single item of merchandise, such as a can of a particular brand of soda.

Apparatus Architecture

Figure 1:
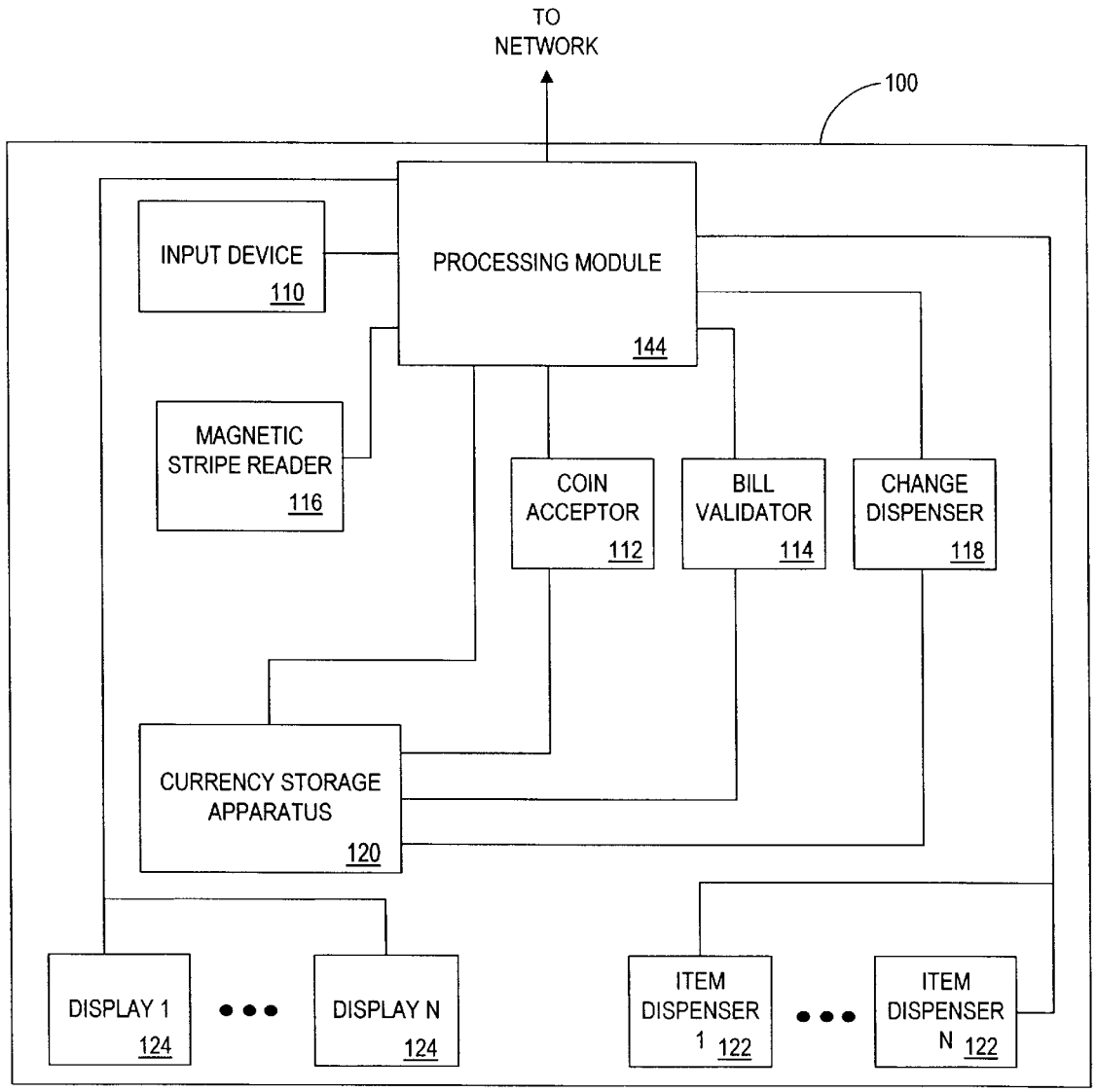
FIG. 1 is a schematic block diagram illustrating the components of the vending machine according to one embodiment of the present invention.
Figure 2:
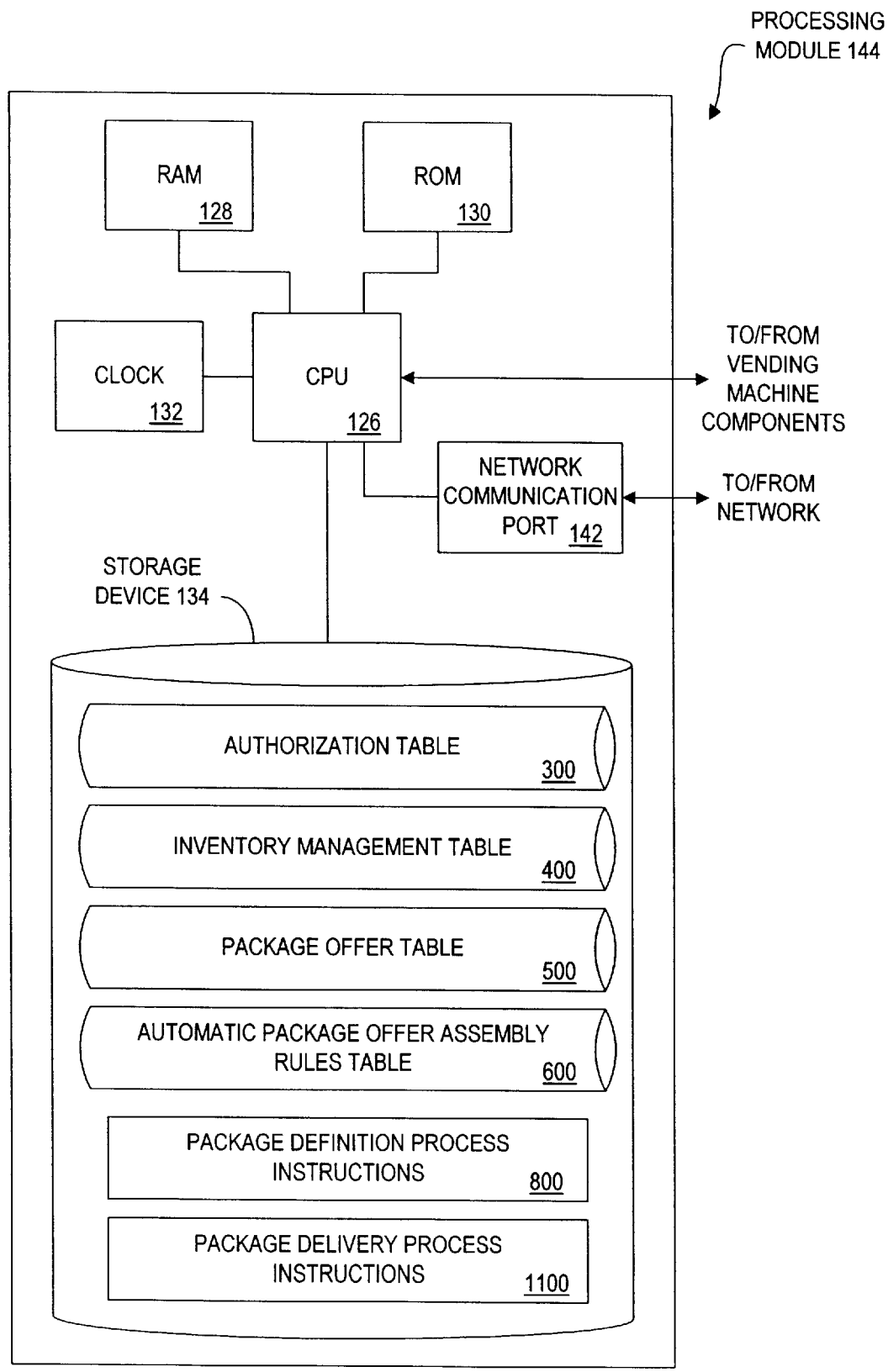
FIG. 2 is a schematic block diagram illustrating the components of the processing module of the vending machine of FIG. 1.

An embodiment of the method and apparatus of the present invention will now be discussed with reference to FIGS. 1–2. FIGS. 1 and 2 illustrate the components of one exemplary vending machine 100 including the features of the present invention. Although specific exemplary vending machine 100 is referred to throughout the detailed description, the present invention is directed to any automatic sales machine that allows payment to be exchanged for goods. Payment can be presented through a variety of media including, but not limited to, coins, bills and other currencies, magnetic stripe cards and smart cards (whether pre-paid or linked to an account), and identification codes. FIG. 1 is a schematic block diagram of vending machine 100; and FIG. 2 is a schematic block diagram of processing module 144 of vending machine 100.

As shown, vending machine 100 includes an input device 110 for receiving input from a customer indicating a product selection. Input device 110 may also be used for receiving input from an operator during stocking or maintenance of vending machine 100. Input device 110 preferably includes a set of alpha-numeric keys for providing input to vending machine 100. Alternatively, input device 110 could include a selector dial, a set of buttons associated with a respective set of item dispensers, or any other conventional input device commonly employed by a vending machine designer. Further, vending machine 100 may include more than one input device 110. For example, vending machine 100 may include an exterior input device 110 for receiving customer input and an interior input device (not shown) for receiving operator input. In the illustrated embodiment, input device 110 provides the dual functionality of receiving input data from both operators and customers.

Vending machine 100 also includes several mechanisms for receiving payment and dispensing change, including coin acceptor 112, bill validator 114, magnetic stripe reader 116 and change dispenser 118. Magnetic stripe reader 116 is a conventional reader for reading data on the magnetic stripe of a credit or debit card, and it may cooperate with conventional point-of-sale credit card processing equipment (not shown) to validate card-based purchases through a conventional transaction authorization network. Coin acceptor 112, bill validator 114 and change dispenser 118 communicate with currency storage apparatus 120 and may be conventional devices such as Mars models AE-2400, MC5000, TRC200 or CoinCo model 9300-L. Coin acceptor 112 and bill validator 114 receive and validate currency that is stored by currency storage apparatus 120. Change dispenser 118 activates the return of coinage to the customer.

Referring now to FIG. 2, with continuing reference to FIG. 1, components of vending machine 100, including input device 110, coin acceptor 112, bill validator 114, magnetic stripe reader 116, change dispenser 118, and currency storage apparatus 120, communicate with, and are controlled by, processing module 144. Processing module 144 includes network communication port 142 for communicating with a central server (not shown).

In addition to the elements previously mentioned, processing module 144 includes a central processing unit 126 ("CPU") connected to network communication port 142. CPU 126 communicates with random access memory (RAM) 128, read only memory (ROM) 130 and clock 132. CPU 126 also communicates with at least one item dispenser 122, at least one display 124, and storage device 134.

Vending machine 100 includes multiple item dispensers 122 and multiple corresponding displays 124. In the embodiment of the present invention described herein, each item dispenser 122 and display 124 pair will be described as corresponding to a unique product offered for sale by vending machine 100. One of ordinary skill in the art will recognize that the present invention may be implemented in a vending machine in which multiple item dispenser 122 and display 124 pairs may correspond to a single product.

As shown in FIG. 1, each item dispenser 122 has a corresponding display 124 that displays information pertaining to the product dispensed by item dispenser 122. Typically, display 124 will display the individual price of the corresponding product. Although vending machine 100, as illustrated, includes a plurality of item dispensers 122 and a plurality of displays 124, this is only one possible embodiment of the many types of vending machines that could employ the present invention. Selecting an appropriate conventional item dispensing mechanism, a single item dispenser 122 could be used to dispense items of a plurality of products. Likewise, a single display 124 could be used to communicate prices and other information regarding the plurality of products.

As shown in FIG. 2, storage device 134 stores a database of authorization, inventory and package data, including an authorization table 300, an inventory table 400, a package offer table 500 and an automatic package rules table 600. Tables 300–600 comprise at least a portion of the data stored by storage device 134 and are described more fully with reference to FIGS. 3–6, respectively. Storage device 134 further includes instructions for implementing the steps of the present invention. Specifically, storage device 134 includes instructions enabling at least one package definition process 800 and instructions enabling at least one package delivery process 1100. Storage device 134 is preferably a magnetic disk drive, but could be a CD-ROM drive, optical disk drive, RAM drive or any other conventional storage device as would be deemed appropriate by one of ordinary skill in the art.

Data Tables

FIG. 3 illustrates the contents of an exemplary authorization table 300 in tabular format. Each record of authorization table 300 includes an operator identifier 302 and an authorization code 304 that defines a valid operator identifier/authorization code pair. Authorization table 300 is utilized to enable only authorized operators to access the price management data stored in storage device 134.

Referring now to FIG. 4, there is illustrated an exemplary inventory table 400. Each record of inventory table 400 represents inventory data associated with a product dispensed by vending machine 100. The contents of product identifier field 410 uniquely identifies a record of table 400. Dispenser identifier field 412 stores data identifying a corresponding item dispenser 122, and uniquely identifies a record of table 400 in the present embodiment.

Inventory table 400 also includes available inventory field 414 for storing a quantity of available items associated with product identifier 410. Available inventory field 414 is updated by an operator upon stocking vending machine 100 to reflect the number of items stocked. Vending machine 100 includes processing instructions for updating available inventory field 414 upon each sale of a product, including a sale of a product as a component of a package, to maintain an accurate indication of the quantity of every product and to determine the validity of every package offer.

Inventory table 400 further includes at least two price fields: individual price field 416 and component price field 418. Individual price field 416 stores data defining the price of an item of a product dispensed by the associated item dispenser 122. This price is preferably displayed to a consumer using an associated display 124. Component price field 418 stores data representing the price a unit of the associated product when sold as a component of a package. This price is preferably not displayed to a consumer directly, but may be used to calculate a package price which is displayed to a consumer. This permits the operator of vending machine 100 to alter the price of a product as a component of a package without affecting the price, and thereby the demand, of the product sold separately.

As shown, inventory table 400 also includes item category field 420 for storing a broad classification of the product dispensed by the associated item dispenser 122. The contents of this field may be used to identify complementary products that may be suggested to a consumer according to the method of the present invention.

Figure 8:
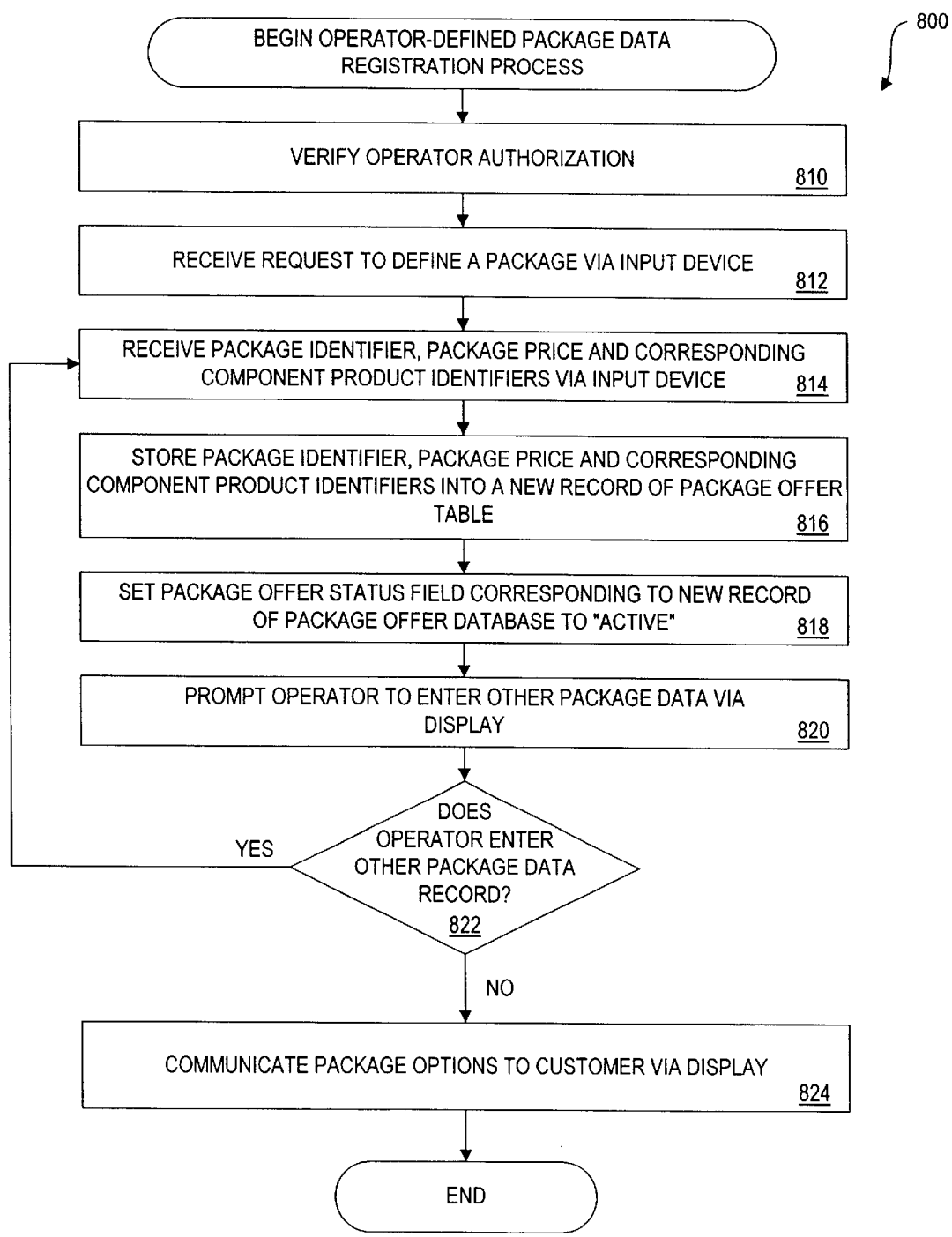
FIG. 8 is a flow chart illustrating the computer-implemented process steps enabling an operator to define a package.

Referring now to FIG. 5, an exemplary package offer table 500 is depicted. Each record of package offer table 500 represents a combination of component products offered at a single price. As illustrated in the discussion of FIGS. 8 and 9 below, the records of package offer table 500 may be generated by the operator of vending machine 100 or may be automatically generated based on processing instructions stored in storage device 134 of vending machine 100.

Package offer table 500 includes a package identifier field 510 for storing data which uniquely identifies a record of package offer table 500. Package price field 512 stores the combined prices for all component products. Package component identifier fields 514, 516 and 518 store product identifiers of the components of a package. While three component identifier fields are illustrated in FIG. 5, the present invention may be practiced with more or fewer component identifiers associated with a package.

Package offer table 500 further includes purchase status field 520 for storing data representing a status of the package. Examples of valid status data include "active" "inactive." More specific status data may, of course, be employed based on the specific implementation. The contents of purchase status field 520 illustrated by record 534 of table 500 indicates that the associated package is unavailable. A number of conditions may render a package unavailable. For example, a package may be unavailable due to a sold out or expired component product.

Package offer table 500 also includes definition identifier field 522 for storing an identifier indicating how the package offer table record was defined. According to table 500, package offer records may be defined based on operator input or an automatic package rule, described more fully with reference to FIG. 6.

Figure 6:
FIG. 6 depicts an exemplary automatic package rules table stored in the memory of the vending machine of FIG. 1.

Referring now to FIG. 6, there is depicted an exemplary automatic package rules table 600. Table 600 may be used in one embodiment of the present invention to automatically assemble a package of component products to offer to a consumer. Every record of table 600 is assigned a unique rule identifier stored in rule identifier field 610. Table 600 also includes a rule price field 612 representing the price of the package to be automatically assembled. Table 600 further includes a complementary product categories field 614 representing a list of complementary categories included in the package.

Package offer type field 616 stored data representing a description of the offer type. As shown, record 606 is an upsell offer and record 608 is a periodic offer. Thus, vending machine 100 may be programmed to limit the availability of the packages corresponding to these rules. Offers corresponding to automatic package rule 606 may only be presented as an upsell as described with reference to FIG. 12, and offers corresponding to automatic package rule 608 may be updated periodically as described with reference to FIGS. 9A–9D.

Apparatus Operation

Having thus described the architecture and components of the present invention, the operation of the apparatus will now be described in greater detail with reference to FIGS. 7–13, and continuing reference to FIGS. 1–6. It is to be understood that the software instructions necessary to provide the functionality described herein are preferably stored in storage device 134 of vending machine 100, but may be stored in ROM 130.

Figure 7:
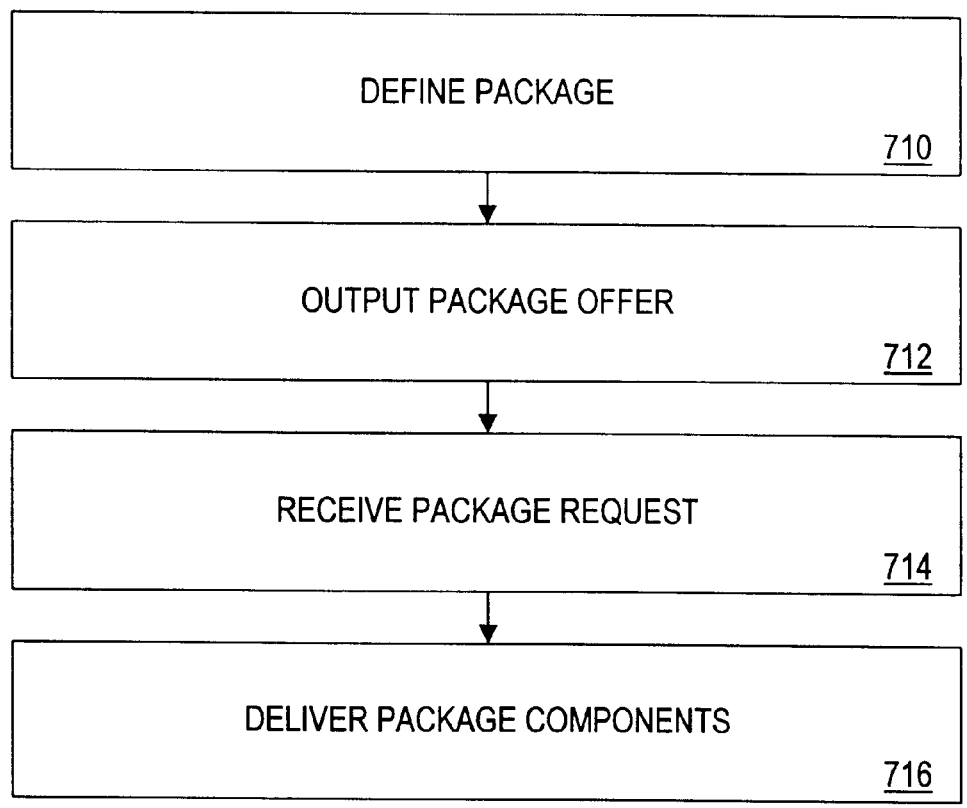
FIG. 7 is a block diagram illustrating the basic processing functions of the present invention.

Referring now to FIG. 7, the basic functions of the present invention are illustrated in block diagram format. While there are multiple ways to implement the present invention, every embodiment will include the four general functions illustrated. Block 710 represents the process of defining a package comprising component products. The definition of a package may be accomplished in a number of ways, including receiving specific product data received from a vending machine operator, referring to automatic package rules stored in storage device 134, receiving specific product data from a customer, or a combination of these ways. The process steps enabling package definition according to these alternative embodiments are described with reference to FIGS. 8–10.

Block 712 represents communication of a package offer to a customer. Although accomplishing this function may be as simple as placing an advertisement near vending machine 100, this function is preferably performed by outputting a message via display 124 of vending machine 100. Block 714 represents receiving a package request from a customer indicating a desire to purchase multiple component products for a single price. This function may include receiving a package identifier from the customer, but it may alternatively include receiving a response to a suggestive sales message provided by vending machine 100. Block 716 represents delivery of the component products comprising the package to the customer. The process steps for accomplishing delivery of a package according to several alternative embodiments are described with reference to FIGS. 11–13.

Package Definition

Referring now to FIG. 8, the process steps executed by CPU 126 to permit an operator to define a package will be described. At step 810, CPU 126 performs a routine to verify the authorization of the operator using authorization table 300. The routine represented by step 810 may be performed in any number of ways that are well known to one of ordinary skill. At step 812, CPU 126 receives via input device 110 an operator-generated request to define a package. CPU 126 further receives package definition data via input device 110, as indicated by step 814. The package definition data includes a package identifier, a package price and at least one corresponding component product identifier. At step 816, the received package definition data is then stored in a record of package offer table 500. At step 818, CPU 126 sets status field 520 of the relevant record of package offer table 500 to "ACTIVE."

Once the relevant package data has been defined and stored, CPU 126 prompts the operator to enter other package data, as indicated at step 820. If the operator indicates a desire to continue defining packages, decision step 822 directs CPU 126 to continue processing at step 814. Otherwise, CPU 126 processes step 824 and communicates the defined package offers to customers via display 124, thereby completing the operator-defined package data registration process.

In addition to instructions for an operator-defined package data registration process, the present invention may also include instructions for an automatic package definition process. Such a process directs CPU 126 to automatically populate records of package offer table 500 based on pre-defined criteria. CPU 126 examines every record in automatic package rules table 600, identifies combinations of records in inventory table 400 that meet the rules criteria and creates a record in package offer table 500 for every acceptable combination.

Figure 9A:
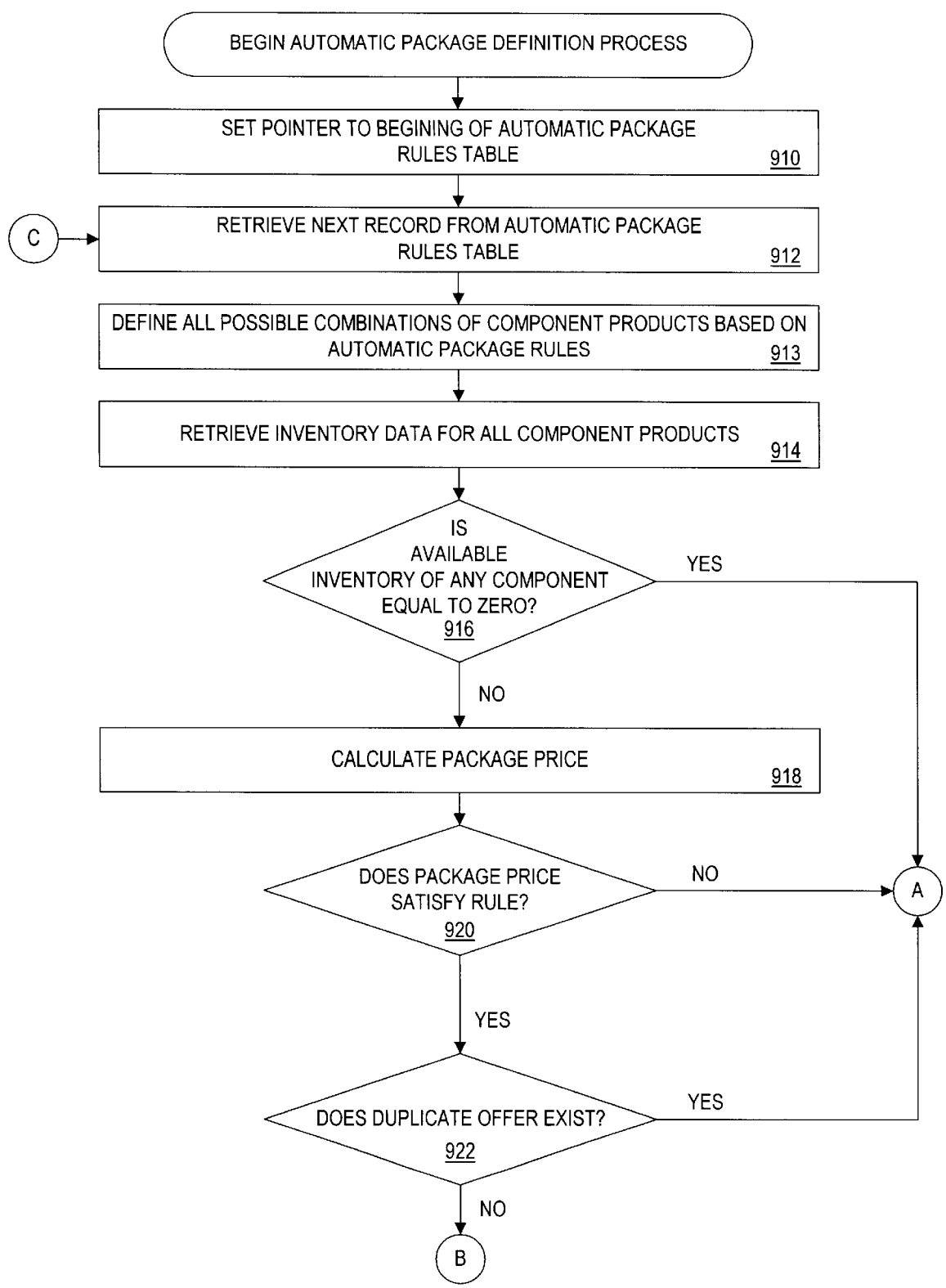
FIGS. 9A and 9B are flow charts illustrating the computer-implemented processes steps for automatically defining package offers according to predetermined rules.
Figure 9B:
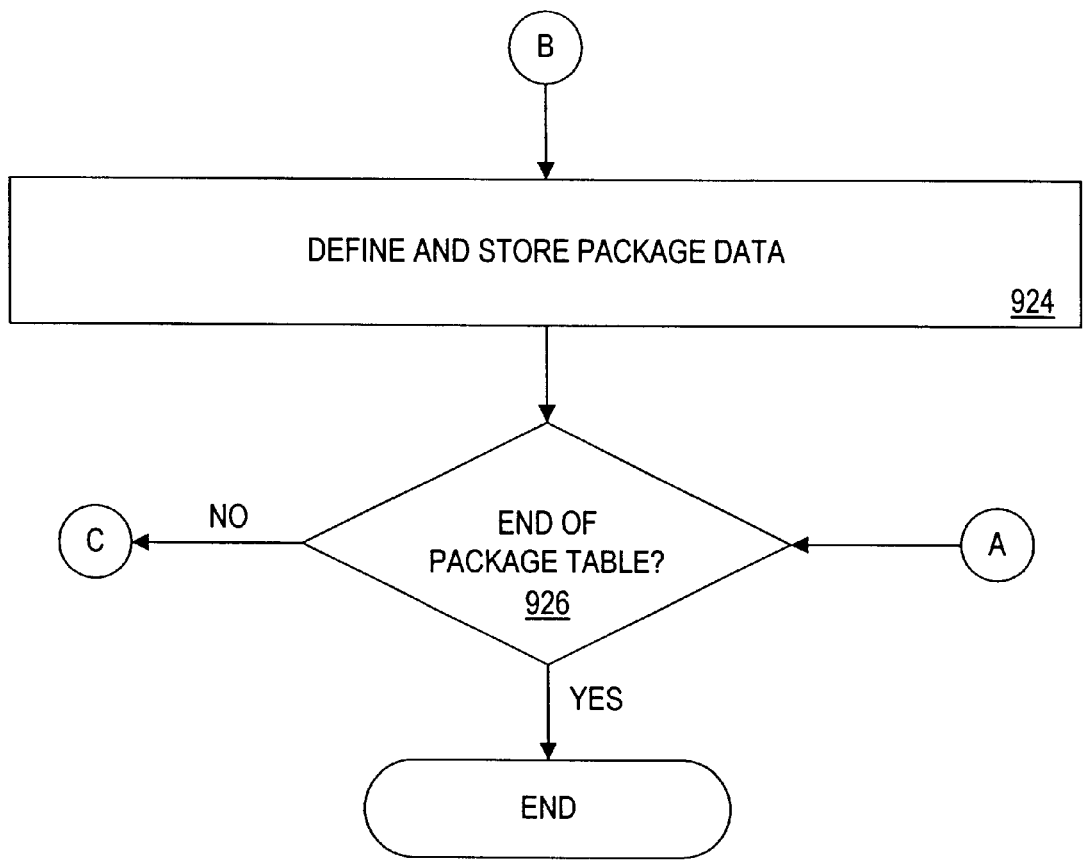

Referring now to FIG. 9A–9D, exemplary process steps are illustrated for automatically defining and maintaining package offers according to rules data stored in automatic package rules table 600. FIGS. 9A and 9B represent an automatic package definition process that is preferably executed periodically. This process automatically defines package offers, and may be performed once upon restocking or periodically, such as after a sale or any time inventory data such as component price or available inventory has been updated. Although conventional vending machines maintain static inventory data during periods of zero sales, vending machines employing dynamic revenue management algorithms may experience changing inventory data resulting from, for example, expiring products or changing demand. It is therefore preferable to periodically execute such a process.

At step 910, a pointer is set to the beginning of automatic package rules table 600. The first record of the table is retrieved at step 912. At step 913, CPU 124 defines all possible combinations of component products based on the retrieved automatic package rules. Steps 914–924 are performed for every combination of component products defined at step 913.

Inventory data for all component products identified by the retrieved automatic package rule record are retrieved at step 914. If the available inventory of any component of a potential package is equal to zero, the package is unavailable, and decision step 916 directs process flow to step 926. Otherwise the package price is calculated at step 918.

At step 920, CPU 126 is directed to determine whether the calculated package price satisfies the relevant rule. If the package price does not satisfy the relevant rule, process flow is directed to step 926. Otherwise CPU 126 determines whether a duplicate package offer exists for the relevant rule. If a duplicate package offer exists, decision step 922 directs CPU 126 to process step 924, and the package offer data is defined and stored. At step 926, CPU 126 determines whether the end of the automatic package rules table is reached. If the end of table 600 has not been reached, the process continues with step 912.

Figure 9C:
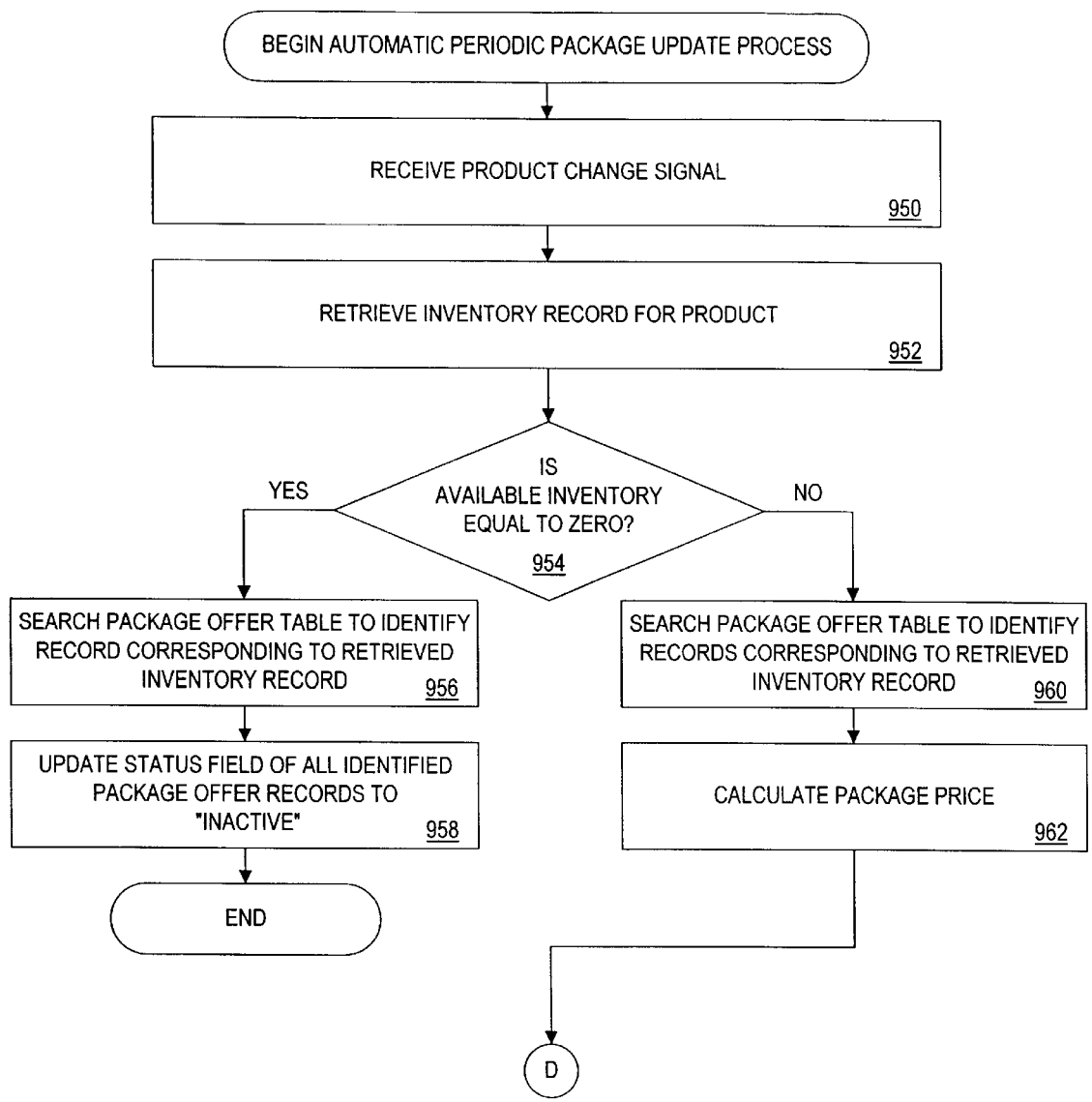
FIGS. 9C and 9D are flow charts illustrating the computer-implemented processes steps for automatically maintaining package offers according to predetermined rules.
Figure 9D:
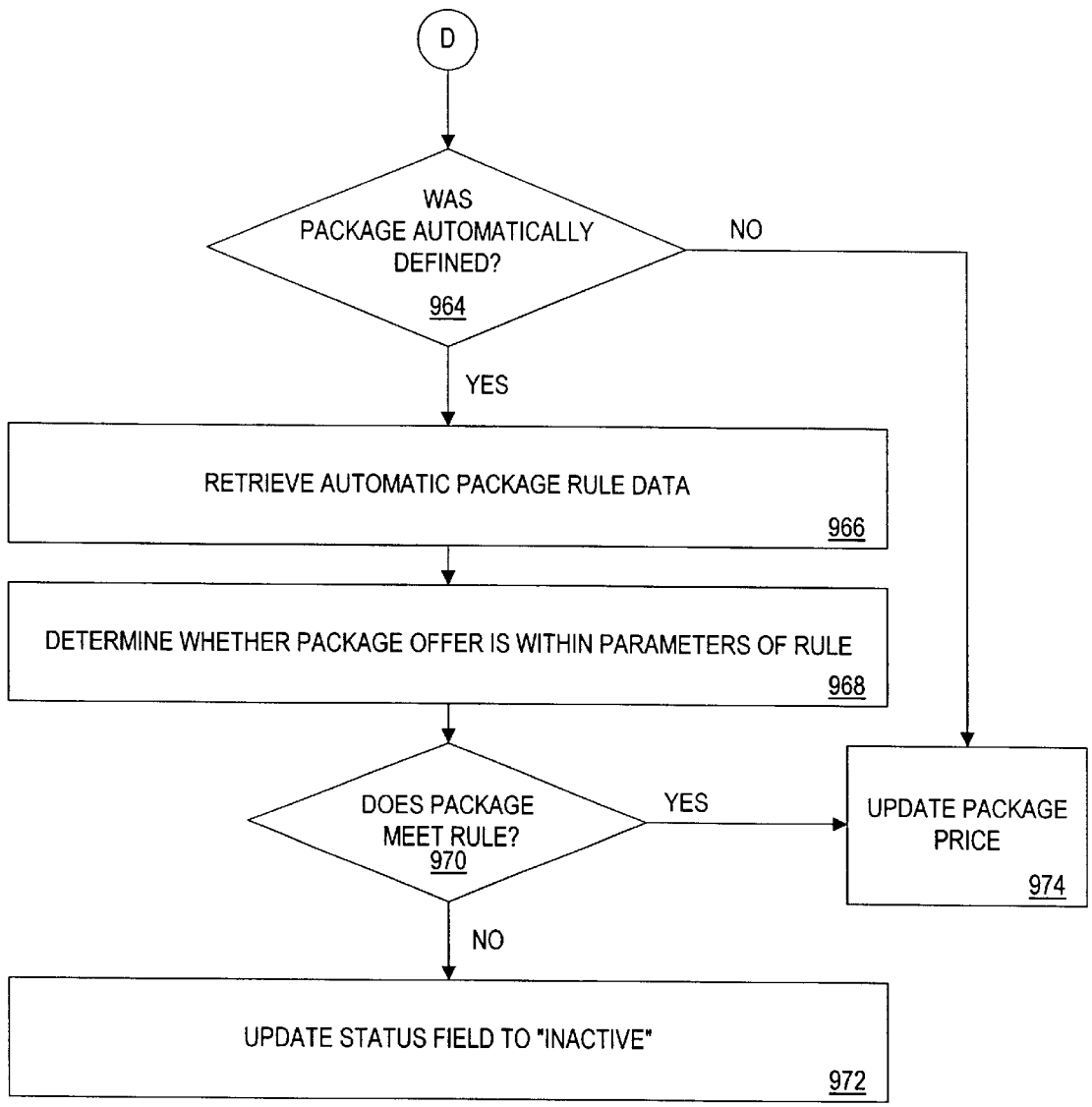

Referring now to FIGS. 9C and 9D, there is illustrated an automatic periodic package update process. This process automatically updates package offers based on changing inventory data. Changes to inventory data which may trigger the execution of the illustrated process include a change in component price and a change in available inventory.

At step 950, CPU 126 receives a signal representing a change in inventory data for an identified product. CPU 126 retrieves the inventory record for the identified product at step 952. At decision step 954, CPU 126 determines whether the available inventory for the identified product is equal to zero, and directs process flow to step 956 or 960 for a zero and non-zero determination, respectively. At step 956, CPU 126 searches package offer table 500 and identifies all records corresponding to the inventory record retrieved at step 952. The status field of every package offer records identified at step 952 is updated to "INACTIVE" at step 958.

If process flow is directed to step 960, the available inventory field of the inventory record retrieved at step 952 is greater than zero. Step 960 directs CPU 126 to search package offer table 500 to identify all records corresponding to the retrieved inventory record. For every identified package, the package price is calculated at step 962. Field 522 of every package record is examined to determine whether the package was automatically defined. If a package was not automatically defined, decision step 964 directs process flow to step 974, and CPU 126 updates the package price.

For an automatically defined package offer, CPU 126 retrieves the corresponding automatic package rule data at step 966. At step 968, CPU 126 determines whether the package offer is within the parameters of the corresponding automatic package rule. If the package definition meets the parameters of the automatic rule, decision block 970 directs CPU 126 to update the package price. Otherwise, the status field of the package offer record is set to "INACTIVE," as shown by step 972, whereby communication of the package offer via display 124 is terminated.

Figure 10:
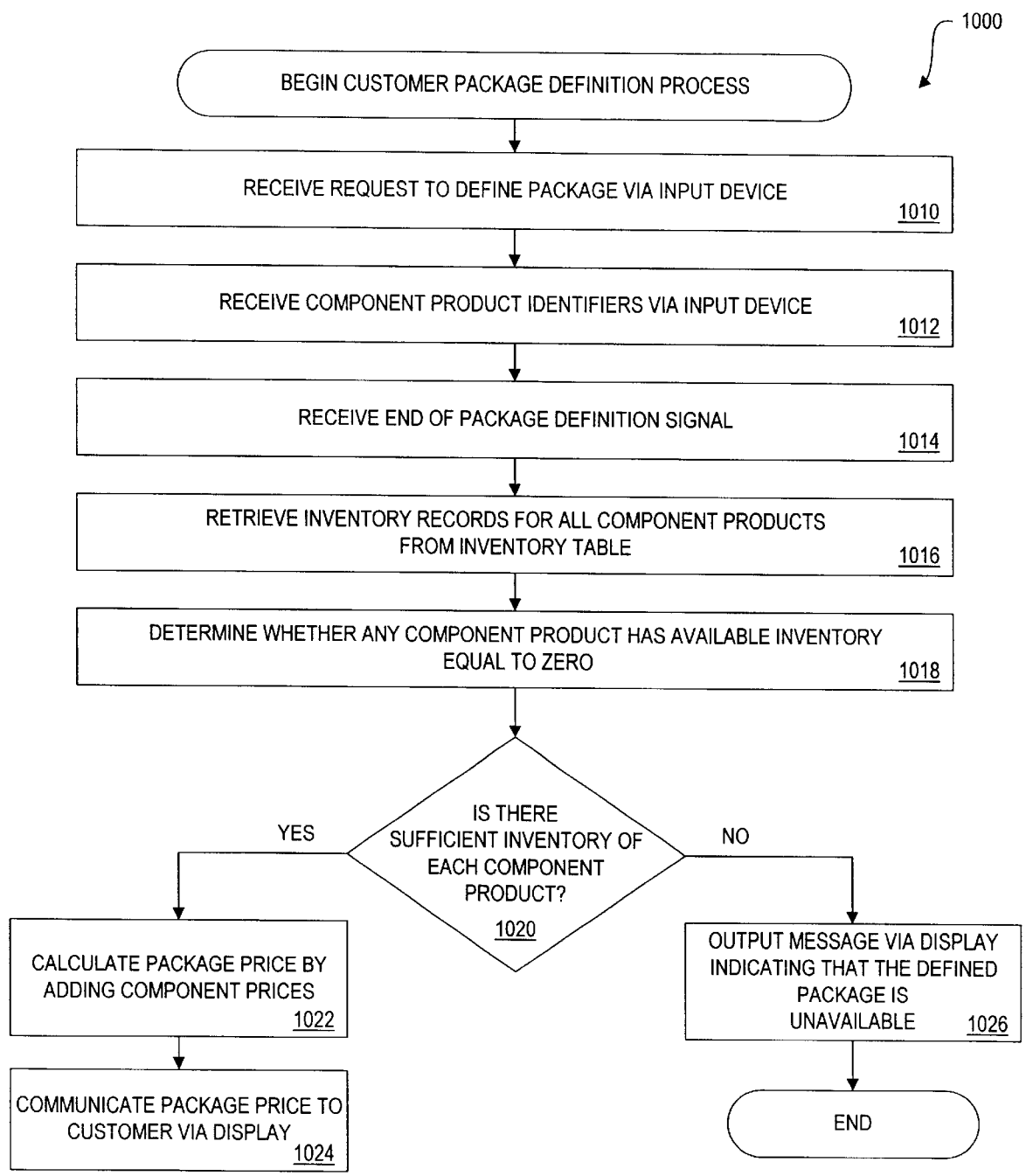
FIG. 10 is a flow chart illustrating the computer implemented process steps for enabling a customer to define a package.

In addition to operator defined package offers and package offers automatically defined based on stored rules, package offers may be defined by a customer of vending machine 100. Referring now to FIG. 10, the process steps of an exemplary customer package definition process are illustrated. At step 1010, CPU 126 receives a customer request via input device 110 to define a package. CPU 126 receives from the customer the component product identifiers via input device 110 at step 1012. At step 1014, CPU 126 receives a signal indicating the completion of the package definition.

At step 1016, CPU 126 retrieves from inventory table 400 the inventory record corresponding to each of the received component product identifiers. Step 1018 then directs CPU 126 to determine whether any component product has an available inventory equal to zero. If there is sufficient inventory of each component product, process flow passes through decision step 1020 to step 1022. Otherwise, CPU 126 is directed to output a message via display 124 indicating that the requested package is not available, as illustrated by step 1026.

If all component products of the defined package are available, CPU calculates the package price at step 1022. The package price is calculated by adding the component prices of each component product. The package price is communicated to the customer via display 122 at step 1024.

Package Distribution

Figure 11:
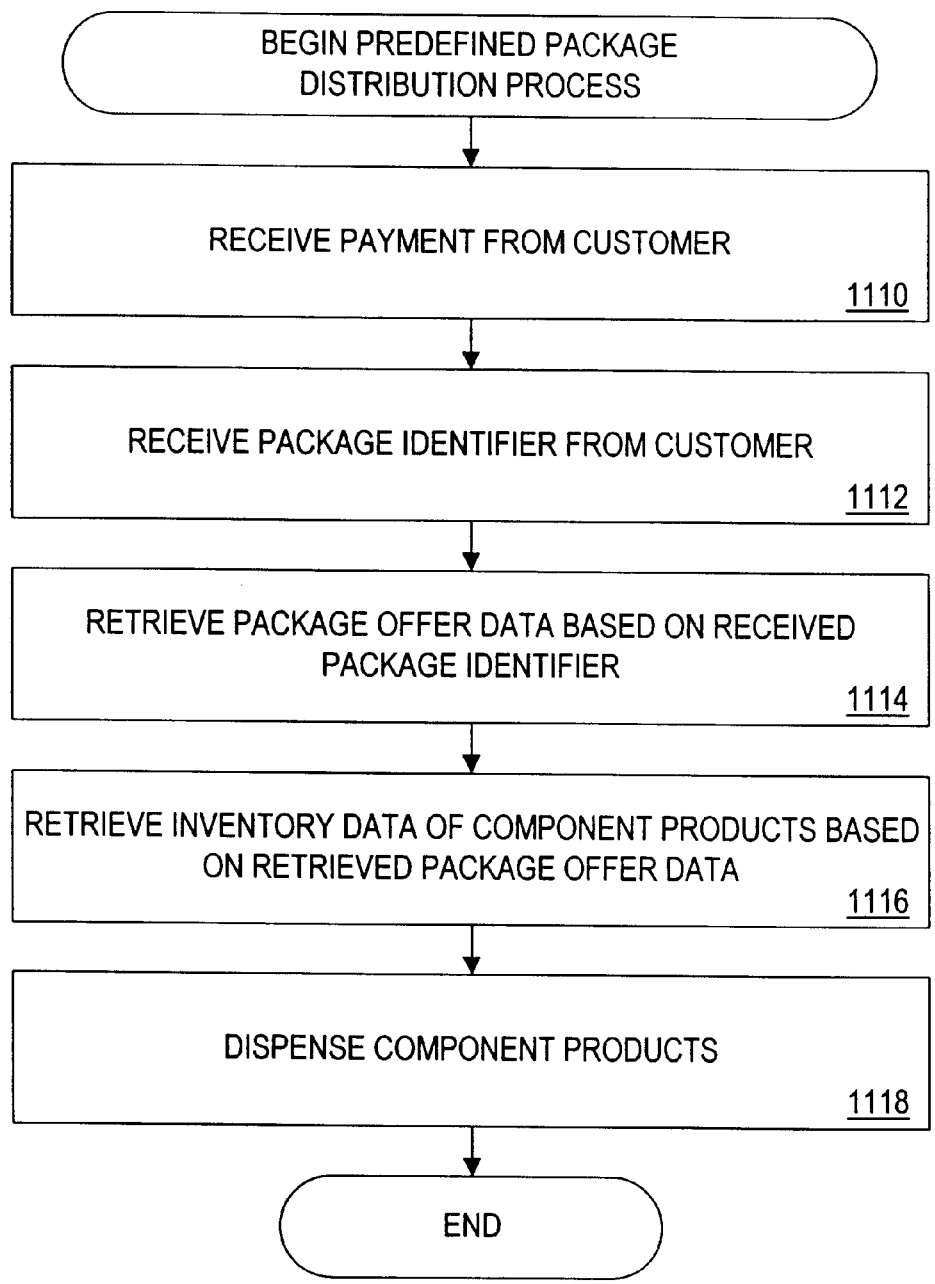
FIG. 11 is a flow chart illustrating the computer-implemented process steps used to distribute the components of a pre-defined package.
Figure 12:
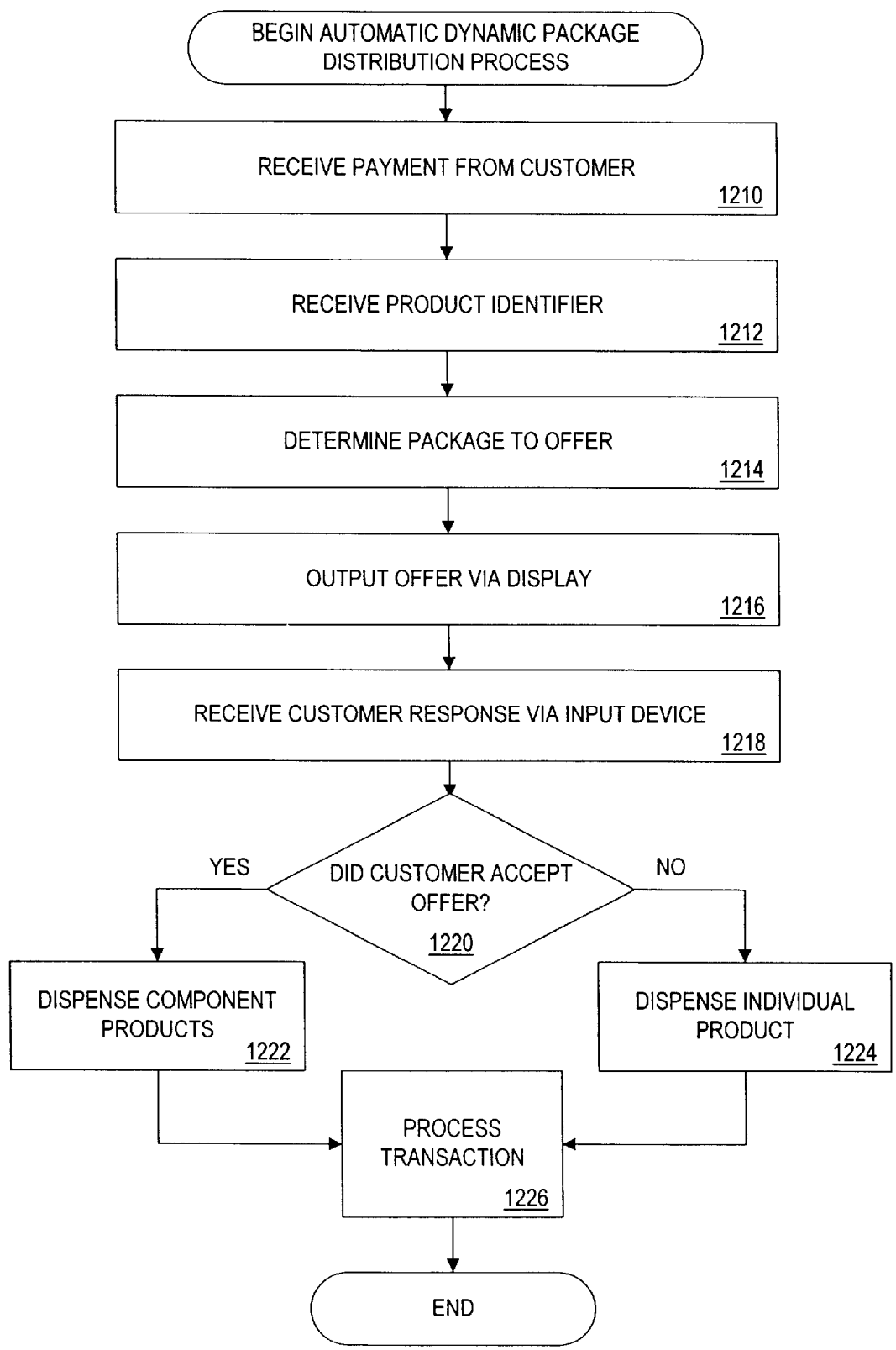
FIG. 12 is a flow chart illustrating the computer-implemented process steps used to distribute the components of an upsell package.
Figure 13:
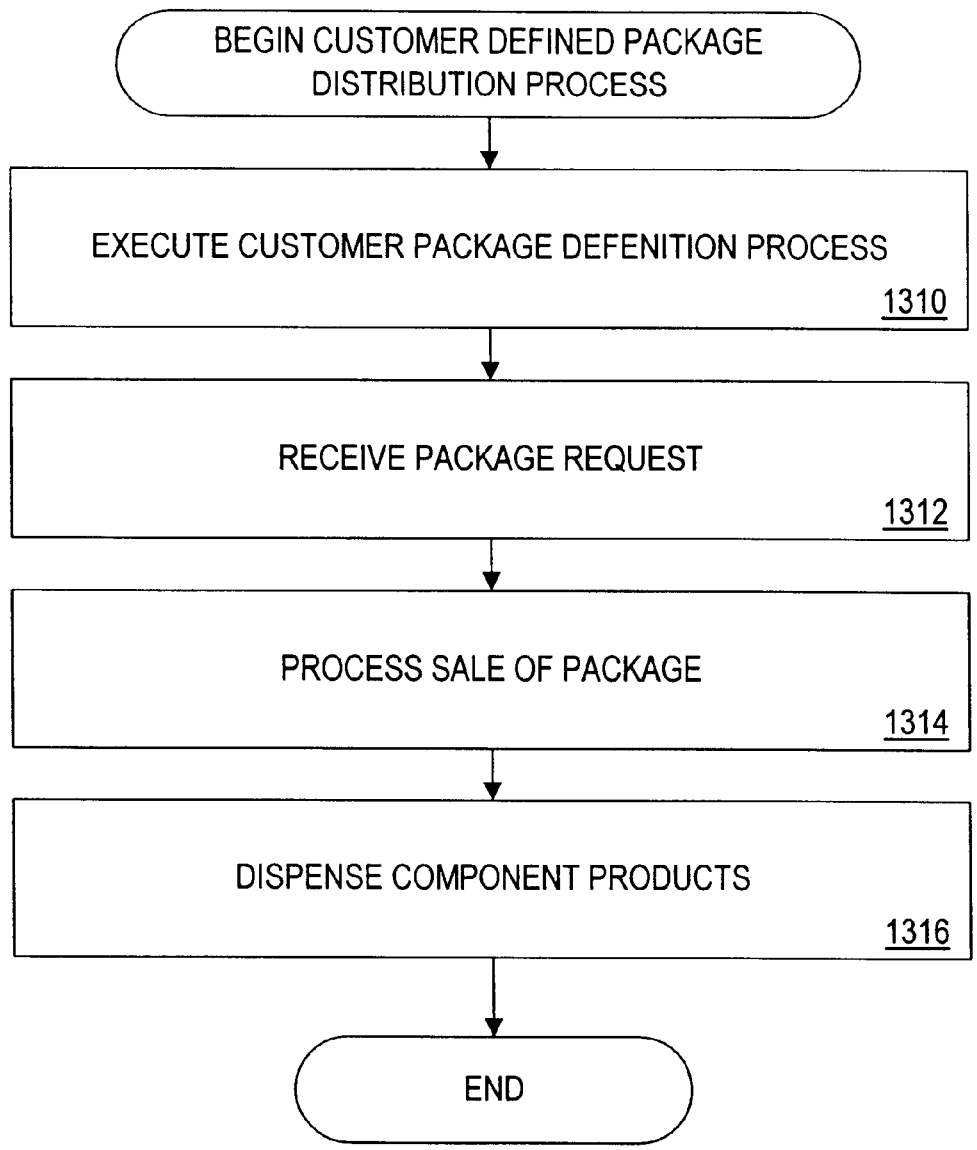
FIG. 13 is a flow chart illustrating the computer-implemented process steps used to distribute the components of a customer-defined package.

FIGS. 11–13 illustrate three alternative processes directed toward distributing component products of a package. FIGS. 11–13 illustrate distribution of a predefined package, distribution of a suggestive sale and distribution of a customer defined package, respectively.

Referring now to FIG. 11, there is depicted a flow chart illustrating the steps of an exemplary process for distributing a predefined package. At step 1110, CPU 126 receives a signal indicating that payment has been received from a customer. Payment may be received via coin acceptor 112, bill validator 114, or magnetic stripe reader 115. CPU 126 then receives a package identifier from the customer via input device 110. The received package identifier is associated with one of the predefined packages stored in package offer table 600. As previously indicated, the predefined package offer data represented by the records of table 600 may be automatically defined based on control logic and/or rules stored in storage device 134 or defined by a vending machine operator. One of ordinary skill will appreciate that the received package identifier may be validated in a number of well known ways.

At step 1114, CPU 126 uses the received package identifier as an index to retrieve package offer data, specifically a record from package offer table 600. CPU 126 then retrieves a record from inventory table 400 for each component product identified in the retrieved package offer record, as shown by step 1116. At step 1118, CPU 126 causes vending machine 100 to dispense the identified component products. Of course, control logic for performing the appropriate accounting and sales management functions, such as verifying that sufficient payment has been received, determining change and adjusting inventory data, may be included in the distribution process.

Referring now to FIG. 12, there is depicted a flow chart illustrating the steps of an exemplary process for distributing "upsell" packages that are marketed based on a customer's initial product selection. These packages may be predefined or dynamically defined at the time of sale based on a first product selection and an amount of payment deposited. At step 1210, CPU 126 receives a signal indicating that payment has been received from a customer. At step 1212, CPU 126 receives a product identifier via input device 110.

At step 1214, CPU 126 is directed to determine a package to offer the customer. The determination of the package includes identifying the component products of the package and determining the package price. The determined package offer is considered an "upsell" —an offer to sell both the product corresponding to the received product identifier and a second complementary product at a package price.

The step of determining a package to offer the customer may be accomplished in various ways. For example, step 1214 may be preformed according to control logic that directs CPU 126 to select a package from among the predefined packages represented by the records of package offer table 500. Alternatively, step 1214 may be performed according to control logic that directs CPU 126 to define a package at the time of sale based on the rules represented by the stored records of automatic package rules table 600. Such control logic would direct CPU 126 to use the inventory data corresponding to the received first product identifier, the amount of payment received, the rules data of table 600 and the inventory data of table 400 to derive one or more acceptable second products to offer to a customer.

The control logic of step 1214 may limit the type of package that is offered to the customer. For example, in the broadest embodiment, the package determined at step 1214 may be any package that includes the identified product. In such an alternate embodiment, the customer may be required to deposit more money or may receive change after purchasing the package.

In a preferred embodiment, the package determined at step 1214 may be an upsell package offer for a rounded price, such as $1.00, thereby designed not only to eliminate the need for receiving additional payment but also to eliminate the need for dispensing change. Such an upsell package includes the product identified by the received product identifier and at least one complementary product at a package price equal to the amount deposited at step 1210. CPU 126 may be directed to base the determination of the package on the payment received from the customer at step 1210 or on a rounded amount equal to the change due according to the product identified at step 1212.

In yet another alternative embodiment, step 1214 may include control logic for providing a customer with a "mystery package." Such alternative control logic would instruct CPU 126 to determine a set of second product identifiers representing products that are complementary to the first product, and offer the customer the option to purchase a second product without providing an exact description of the second product. If the customer accepts the offer, the customer discovers the selection of the second product after the first and second products are dispensed at step 1222. This alternative control logic could be employed by a vending machine operator to increase sales of low-demand or expiring products.

At step 1216, CPU 126 outputs a message extending the offer via display 124, and CPU 126 receives input from the customer via input device 110 at step 1218. The received input indicates whether the customer accepts or declines the offer. If the customer declines the offer, decision step 1220 directs CPU 126 to dispense the first product and process the transaction, as shown by steps 1224 and 1226. If the customer accepts the offer, CPU 126 dispenses the component products and processes the transaction as shown by steps 1222 and 1226.

Referring now to FIG. 13, there is depicted a flow chart illustrating the steps of an exemplary process for distributing the components of a customer-assembled package. As illustrated, the customer defined package distribution process includes customer package definition process 1000. At step 1310, CPU 126 receives a signal via input device 110 representing a request to purchase the defined package. CPU 126 processes the sale of the package at step 1312, including requiring additional payment and calculating and dispensing change to the customer. At step 1314, CPU 126 causes the component products to be dispensed.

Network Embodiments

In addition to the stand alone embodiments previously described, the present invention is also well-suited to be implemented in a variety of network embodiments. In one such embodiment, vending machine 100 may be connected to a vending server (not shown) and may preferably transmit digitally encoded data and other information between the server and/or other vending machines. The communication links between vending machine 100 and vending server preferably comprise a cable, fiber or wireless link on which electronic signals can propagate. For example, vending machine 100 may be connected via an Internet connection using a public switched telephone network (PSTN), such as those provided by a local or regional telephone operating company. Alternatively, each node may be connected by dedicated data lines, cellular, Personal Communication Systems ("PCS"), microwave or satellite networks.

In this configuration, the previously described functionality provided by processing module 144 (i.e. package definition) can be remotely performed by the vending server. Of course, conventional cryptographic techniques may be employed to ensure the authenticity of remote data received by the vending server or any connected vending machine. The vending server can also facilitate delivery of component products from among several networked vending machines allowing a customer to request a package from vending machine 100 and receive products from several networked vending machines.

While the best mode for carrying out the invention has been described in detail, those familiar with the art to which the invention relates will recognize various alternative designs and embodiments for practicing the invention. These alternative embodiments are within the scope of the present invention. Accordingly, the scope of the present invention embodies the scope of the claims appended hereto.

We claim:

1. A method comprising:
   maintaining a database of at least one upsell price, said upsell price corresponding to an upsell product;
   generating a credit amount, the credit amount representing an amount of deposited currency;
   receiving a product identifier corresponding to a selected product;
   determining a product price corresponding to the selected product;
   determining a round-up amount representing a difference between the credit amount and the product price;
   comparing the round-up amount with at least one of the upsell prices in the database; and
   if the round-up amount corresponds to a compared upsell price,
      identifying at least one upsell product in the database which corresponds to the compared upsell price, and
      outputting a signal indicative of the identified upsell product.

2. The method of claim 1 wherein the upsell price represents a component price of the corresponding upsell product.

3. The method of claim 1 wherein the upsell price represents an individual unit price.

4. The method of claim 1 wherein the product price represents a component price.

5. The method of claim 1 wherein the product price represents an individual unit price.

6. A method comprising:
   maintaining a database of at least one upsell package price, said upsell package price corresponding to an upsell package;
   generating a credit amount, the credit amount representing an amount of deposited currency;
   receiving a product identifier corresponding to a selected product;
   identifying at least one upsell package in the database which corresponds to the credit amount and the received product identifier; and
   outputting a signal representing an instruction to dispense component products of the upsell package.

7. A method comprising:
   maintaining a database of a plurality of product data sets, each product data set including a component price and a product characteristic, each of the plurality of data sets corresponding to a tangible product dispensed at a vending machine;

comparing at least a portion of a first data set corresponding to a first product and at least a portion of a second data set corresponding to a second product;

determining whether the first product and the second product are complementary based on said step of comparing;

if the first product and the second product are complementary, determining a package price for the first and second products, and outputting signals indicative of an offer to sell the first and second products for the package price.

8. The method of claim 7 wherein said step of comparing includes comparing a first component price to a second component price.

9. The method of claim 7 wherein said step of comparing includes comparing a first product characteristic to a second product characteristic.

10. A vending machine comprising:

a memory configured to store:

a database of a plurality of product data sets, each product data set including a component price and a product characteristic, each of the plurality of data sets corresponding to a tangible product dispensed at a vending machine; and a processor configured to:

compare at least a portion of a first data set corresponding to a first product and at least a portion of a second data set corresponding to a second product;

determine whether the first product and the second product are complementary based on said step of comparing; and if the first product and the second product are complementary, determine a package price for the first and second products, and output signal indicative of an offer to sell the first and second products for the package price.

11. A method, comprising:

receiving, at a vending device, a payment amount;

receiving a product identifier identifying a first product dispensed at the vending device;

determining a first price for the first product;

determining a round-up amount representing a difference between the payment amount and the first price;

identifying an at least first upsell offer corresponding to the round-up amount, the at least first upsell offer corresponding to an upsell product; and outputting a signal indicative of the upsell offer.

12. The method of claim 11, further comprising:

receiving an acceptance of the upsell offer; and dispensing the upsell product from the vending device.

13. The method of claim 12, further comprising: dispensing the first product from the vending device.

14. A vending machine, comprising:

a memory configured to store:

a database of at least one upsell price, the upsell price corresponding to an upsell product;

a credit amount representing an amount of deposited currency;

a product identifier corresponding to a selected product;

an input device configured to receive the product identifier; and a processor configured to:

generate the credit amount;

determine a product price corresponding to the product identifier;

determine a round-up amount representing a difference between the credit amount and the product price;

compare the round-up amount with at least one of the upsell prices in the database; and if the round-up amount corresponds to a compared upsell price, identify at least one upset product in the database which corresponds to the compared upsell price, and output a signal indicative of the identified upsell product.

15. The vending machine of claim 14, wherein the upsell price represents a component price of the corresponding upsell product.

16. The vending machine of claim 14, wherein the upsell price represents an individual unit price.

17. The vending machine of claim 14, wherein the product price represents a component price.

18. The vending machine of claim 14, wherein the product price represents an individual price.

19. A vending machine, comprising:

a memory, configured to store:

a received payment amount;

a product identifier; and at least a first upsell offer;

an input device, configured to receive the product identifier;

a processor, configured to:

determine a first price of a first product identified by the product identifier;

determine a round-up amount representing a difference between the received payment amount and the first price; and identify the at least first upsell offer corresponding to the round-up amount, the at least first upsell offer corresponding to an upsell product.

20. The vending machine of claim 19, wherein the processor is further configured to:

cause a signal to be output indicative of the at least first upsell offer.

21. The vending machine of claim 19, wherein the processor is further configured to:

receive an acceptance of the upsell offer; and cause the upsell product to be output from the vending machine.

22. A vending apparatus, comprising:

means for receiving a payment amount;

means for receiving a product identifier identifying a first product dispensed at the vending apparatus;

means for determining a first price for the first product;

means for determining a round-up amount representing a difference between the payment amount and the first price; and means for identifying an at least first upsell offer corresponding to the round-up amount, the at least first upsell offer corresponding to an upsell product.

23. A vending apparatus, comprising:

storage means, storing at least one upsell package price, the upsell package price corresponding to an upsell package;

means for generating a credit amount, the credit amount representing an amount of deposited currency;

means for receiving a product identifier corresponding to a selected product;

means for identifying at least one upsell package in the storage means which corresponds to the credit amount and the received product identifier; and means for outputting a signal representing an instruction to dispense component products of the upsell package.

24. A method comprising:

maintaining a database of a plurality of product data sets, each product data set including an individual price and a product characteristic, each of the plurality of data sets corresponding to a tangible product dispensed at a vending machine;

comparing at least a portion of each of at least two of the plurality of data sets corresponding to at least two of the plurality of products;

determining whether the at least two products are complementary based on said step of comparing;

if the at least two products are complementary, determining at least one component price for at least one product;

determining a package price for the at least two products using the at least one component price, and outputting signals indicative of an offer to sell the at least two products for the package price, wherein the package price differs from the sum of the individual price of each of the at least two products.

25. The method of claim 24 wherein one component price is determined for each of the at least two products and wherein the package price is the sum of the component prices of the at least two products.

* * * * *